US007180400B2

(12) United States Patent
Amagasa

(10) Patent No.: US 7,180,400 B2
(45) Date of Patent: Feb. 20, 2007

(54) KEY-LESS ENTRY SYSTEM AND THE METHOD THEREOF

(75) Inventor: Yoshinori Amagasa, Tokyo-To (JP)

(73) Assignee: Fuji Jukogyo Kabushi Kaisha, Tokyo (JP)

( * ) Notice: Subject to any disclaimer, the term of this patent is extended or adjusted under 35 U.S.C. 154(b) by 391 days.

(21) Appl. No.: 10/808,106

(22) Filed: Mar. 24, 2004

(65) Prior Publication Data

US 2004/0189442 A1 Sep. 30, 2004

(30) Foreign Application Priority Data

Mar. 24, 2003 (JP) ............................ 2003-079591

(51) Int. Cl.

| | |
|---|---|
| ***G05B 19/00*** | (2006.01) |
| ***G06F 7/00*** | (2006.01) |
| ***G06K 19/00*** | (2006.01) |
| ***H04B 1/00*** | (2006.01) |
| ***H04Q 1/00*** | (2006.01) |

(52) U.S. Cl. .................... 340/5.51; 340/5.54; 340/5.72

(58) Field of Classification Search ............... 340/5.51, 340/5.54, 5.72, 5.7, 10.42, 825.2, 426; 307/10.4, 307/10; 361/171, 172, 134

See application file for complete search history.

(56) References Cited

U.S. PATENT DOCUMENTS

| | | | | | |
|---|---|---|---|---|---|
| 3,751,718 | A | * | 8/1973 | Hanchett, Jr. | 361/172 |
| 4,425,597 | A | * | 1/1984 | Schramm | 361/172 |
| 4,447,850 | A | * | 5/1984 | Asher | 361/172 |
| 4,455,588 | A | * | 6/1984 | Mochida et al. | 340/5.54 |
| 5,006,697 | A | * | 4/1991 | Amis et al. | 235/91 R |
| 5,204,672 | A | * | 4/1993 | Brooks | 340/825.71 |
| 5,844,470 | A | * | 12/1998 | Garnault et al. | 340/5.62 |

FOREIGN PATENT DOCUMENTS

| | | |
|---|---|---|
| EP | 1 046 771 A1 | 10/2000 |
| FR | 2 821 107 A1 | 8/2002 |
| JP | 01058781 | 3/1989 |

* cited by examiner

*Primary Examiner*—Wendy R. Garber
*Assistant Examiner*—Nam Nguyen
(74) *Attorney, Agent, or Firm*—Smith, Gambrell & Russell

(57) ABSTRACT

A vehicle key-less entry system and a method of unlocking a vehicle door can detect whether or not a vehicle door handle is operated and an operational speed when the door handle is detected by entering a cipher code. Check is made whether the entered cipher code is equal to a prestored cipher code based on the detected operational speed. A locking mechanism is controlled to unlock a vehicle door when the entered cipher code is equal to the prestored cipher code.

14 Claims, 8 Drawing Sheets

KEY-LESS ENTRY SYSTEM AND THE METHOD THEREOF

BACKGROUND OF THE INVENTION

The present invention relates to a key-less entry system and the method thereof without inserting a key into a keyhole.

There are several types of the key-less entry systems for locking/unlocking vehicle doors without inserting the key into the keyhole.

One old type of the key-less entry system employs the key equipped with a lock button and an unlock button for locking/unlocking the vehicle doors by pressing the buttons.

On the other hand, an advanced key-less entry system, such as disclosed in Japanese Unexamined Patent Publication No. 61-5183, is equipped with a door-lock controller for locking/unlocking the vehicle doors by entering a cipher code.

In detail, the cipher code is entered by a combination of operations of a door outer handle and buzzer sounds. A door can be unlocked when the entered cipher code matches a prestored cipher code.

More in details, as illustrated in FIG. 1, the operation of a door outer handle is divided into several sequences by the buzzer sounds. FIG. 1 illustrates entering of a 4-digit cipher code “3431”. A buzzer goes off after a door outer handle is operated three times, which completes an entry of the first digit “3” of the 4-digit cipher code “3431”. In the same way, the second, the third and the fourth digit “4”, “3” and “1” of the 4-digit cipher code are entered. The signs “B” and “BB” in FIG. 1 indicate that the buzzer goes off one time and two times, respectively.

Since each of the four digits can be selected from among 10 digits “0” to “9”, there is 10000 (10×10×10×10) ways of the cipher code entry, which increases the number of operations of the door outer handle.

SUMMARY OF THE INVENTION

A purpose of the present invention is to provide a vehicle key-less entry system and a method thereof with a variety of cipher codes which can be entered by a small number of times of entry operations with a door handle, that offer advanced antitheft features.

The present invention provides a vehicle key-less entry system comprising: door-handle operation detecting means for detecting whether or not a vehicle door handle is operated and an operational mode by detecting a speed of the door handle, for entering a cipher code; checking means for checking whether the entered cipher code is equal to a prestored cipher code based on the detected operational mode; and locking controlling means for controlling a locking mechanism to unlock a vehicle door when the entered cipher code is equal to the prestored cipher code.

Furthermore, the present invention provides a method of unlocking a vehicle door comprising the steps of detecting whether or not the vehicle door handle is operated and an operational speed when the door handle is detected as operated for entering the cipher code; checking whether the entered cipher code is equal to a prestored cipher code based on the detected operational speed; and controlling a locking mechanism to unlock a vehicle door when the entered cipher code is equal to the prestored cipher code.

DETAILED DESCRIPTION OF THE EMBODIMENTS

An embodiment according to the present invention will be disclosed with reference to attached drawings.

Figure 1:
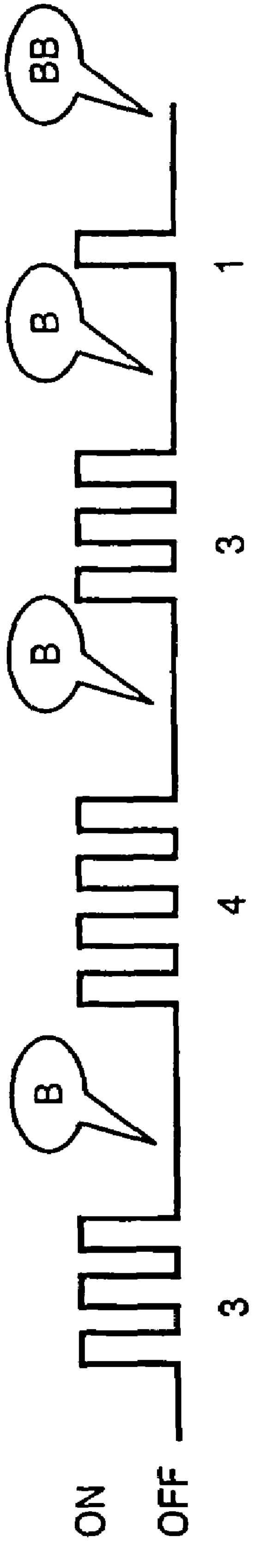
FIG. 1 PRIOR ART
FIG. 1 illustrates a known technique of entering a cipher code.
Figure 2:
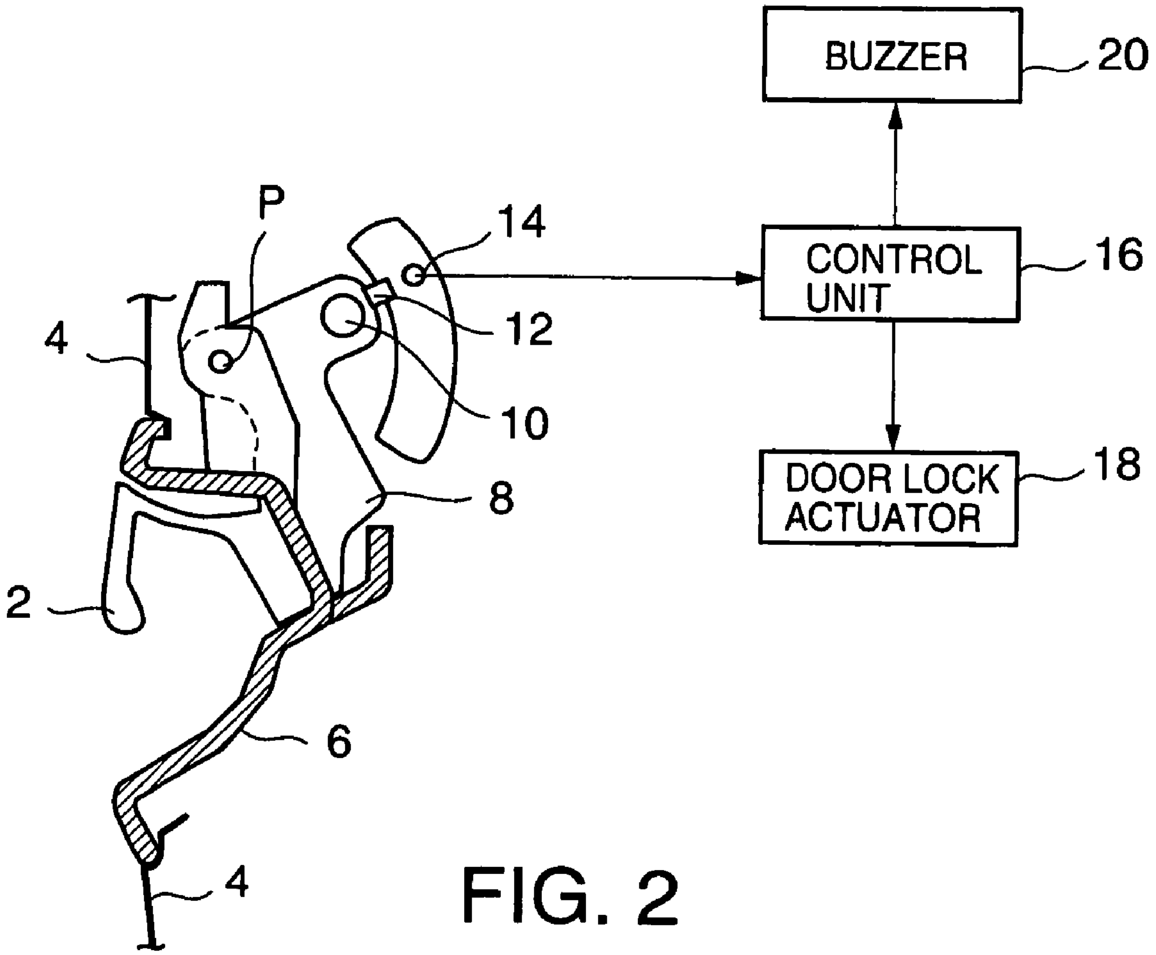
FIG. 2 shows a configuration of an embodiment of a key-less entry system according to the present invention.
Figure 3:
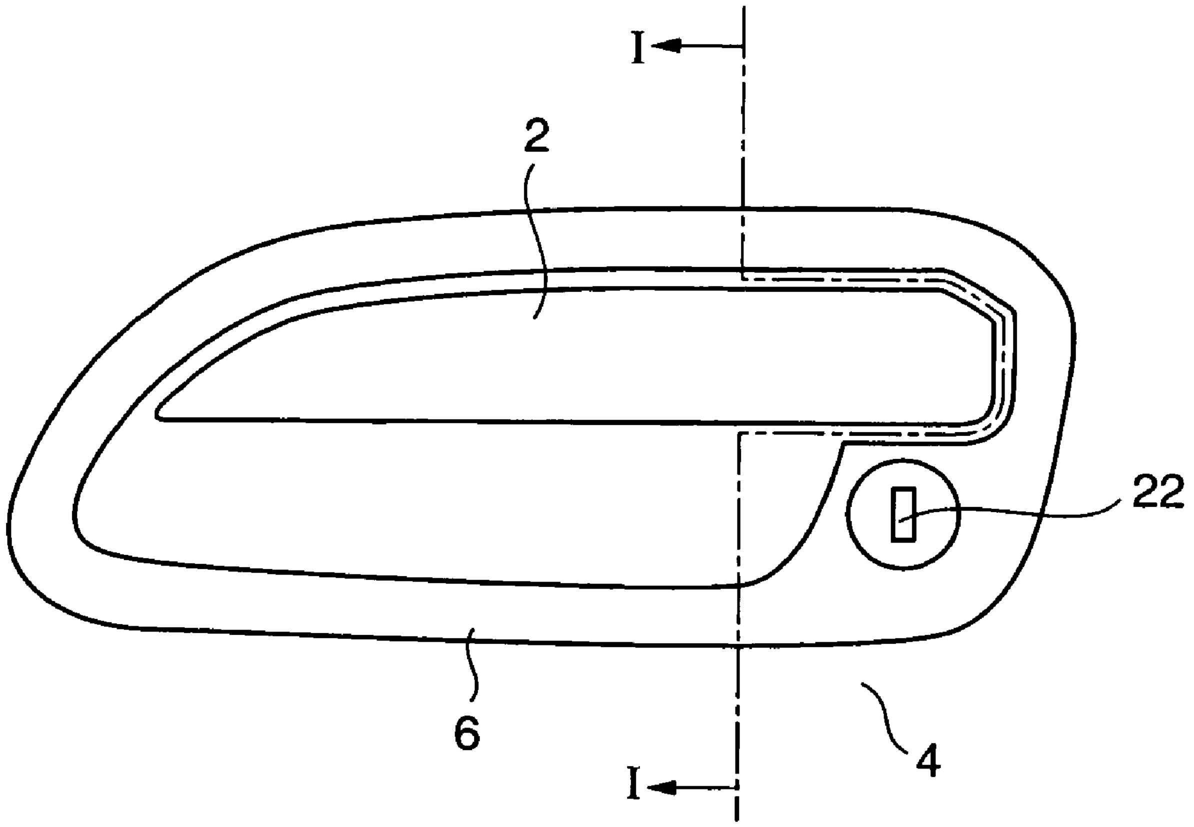
FIG. 3 shows a side view of a door outer handle and its peripherals in the embodiment of the key-less entry system according to the present invention.

FIG. 2 shows a configuration of an embodiment of a key-less entry system according to the present invention. FIG. 3 is a side view of a door outer handle 2. The door outer handle 2 shown in FIG. 2 is a sectional view taken along line I—I of FIG. 3.

The door outer handle 2 is attached to an escutcheon 6 embedded in a door outer panel 4 of a vehicle door. It is held at a specific position (not shown) with a spring, etc, but rotatable about a rotary axis P at which it is attached to the escutcheon 6. Provided inside the door outer panel 4 is a link arm 8 having a joint 10 connected to a door latch (not shown) against the door outer handle 2, with respect to the rotary axis P. This mechanism allows the joint 10 to shift to actuate the door latch when a driver operates the door outer handle 2. The joint 10 is mechanically connected to the door latch via a rod or a wire for opening or closing the door, without any electrical mechanism.

Attached at a top end of the link arm 8 is a magnetic unit 12. Provided at a vehicle body side is a magnetic sensor 14 for detecting a magnetism generated by the magnetic unit 12.

Figure 4A:
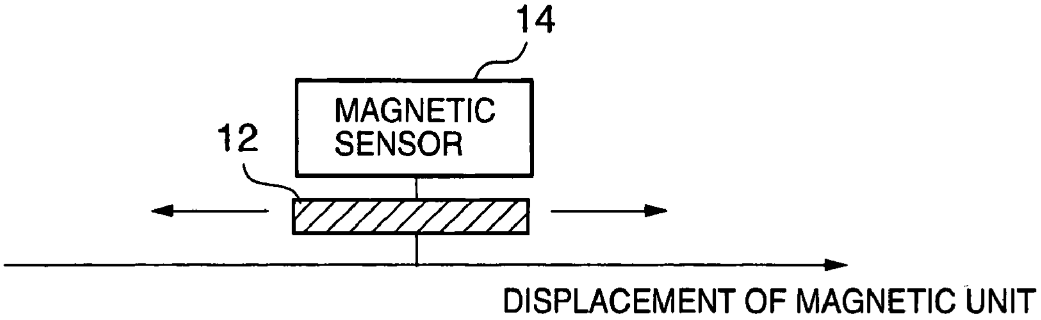
FIGS. 4A and 4B illustrate detection of the movement and speed of the door outer handle when operated.
Figure 4B:
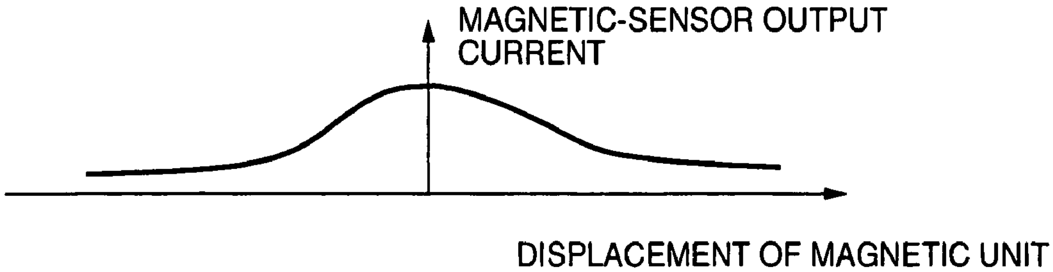

While the magnetic unit 12 is moving in dependency on the operation of the door outer handle 2, as illustrated in FIG. 4A, the magnetic sensor 14 generates a current, as shown in FIG. 4B, in accordance with the movement and a speed of the magnetic unit 12.

The magnetic unit 12 and the magnetic sensor 14 constitute a non-contact switch to function as door-handle operation detecting means.

The magnetic sensor 14 is connected to a control unit 16 having CPU, RAM, ROM, etc., provided at the vehicle-body side. The control unit 16 prestores a cipher code for unlocking the vehicle door.

Connected to the control unit 16 is a door-lock actuator 18 for actuating a locking mechanism for door locking/unlocking in response to a signal from the control unit 16.

Also connected to the control unit 16 is a buzzer 20 that goes off in response to the entry of each digit of the cipher code for unlocking the vehicle door.

The locking mechanism is not disclosed in details because it is a known vehicle-door locking mechanism. At least one locking mechanism among those for several vehicle doors allows manual operations of the door locking/unlocking by inserting a key into a keyhole 22 (FIG. 3) and turning thereof.

Figure 5A:
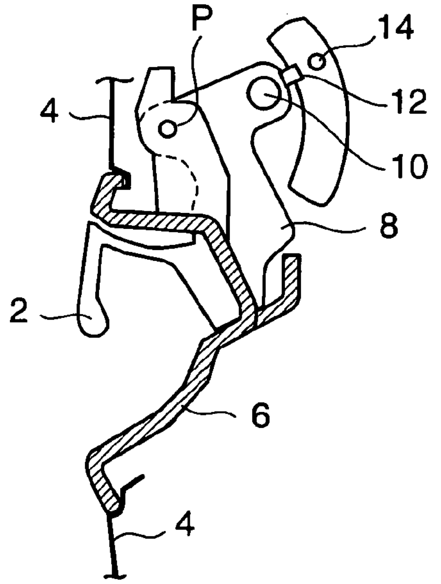
FIGS. 5A and 5B illustrate operational modes of the door outer handle.
Figure 5B:
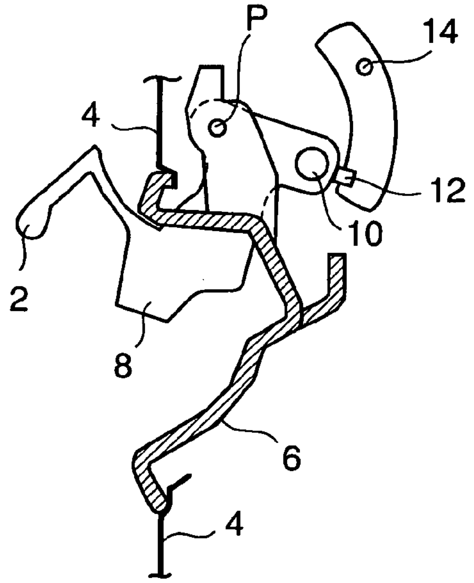

Illustrated in FIG. 5A is that the door outer handle 2 is under no operation in which the magnetic unit 12 and the magnetic sensor 14 are facing each other. On the other hand, FIG. 5B illustrates that the door outer handle 2 is operated in which the magnetic unit 12 and the magnetic sensor 14 are apart (or separated) from each other.

Figure 6:
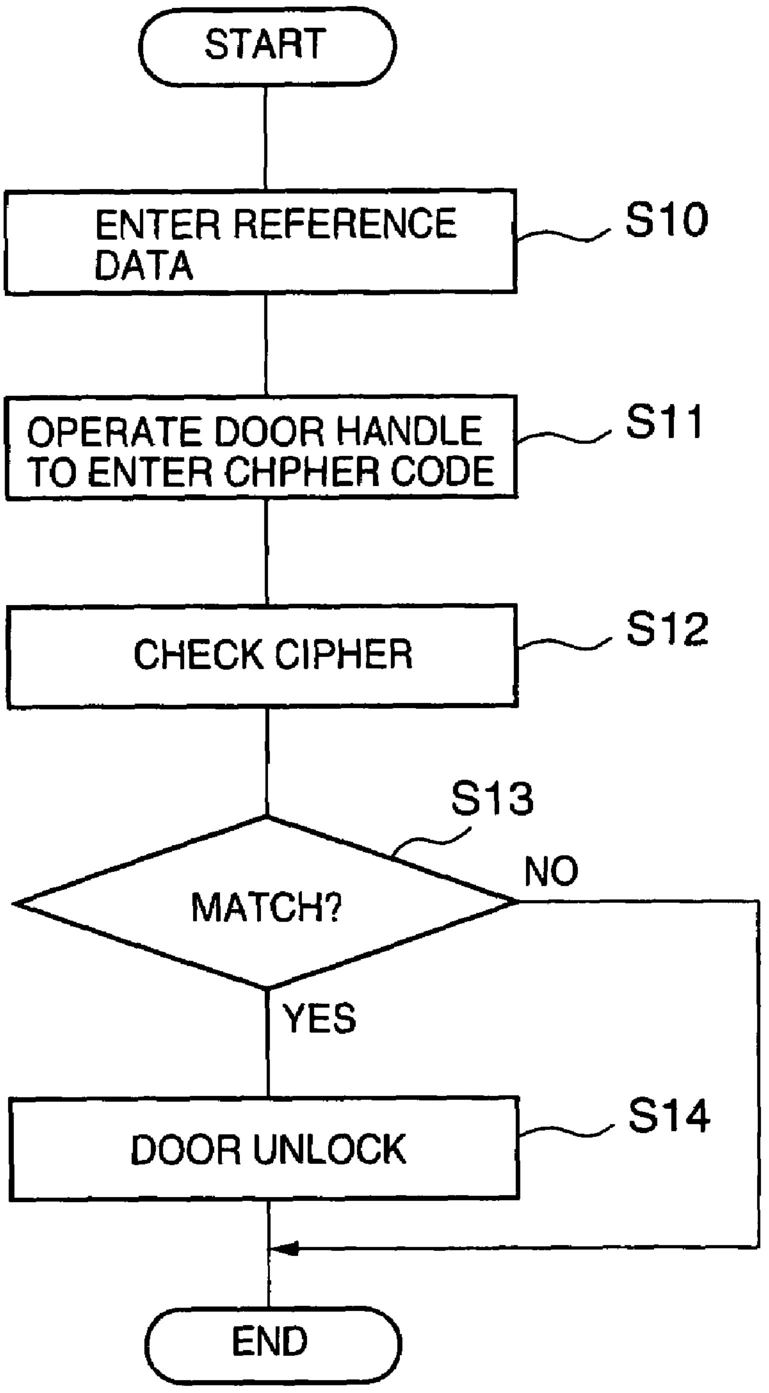
FIG. 6 shows a flowchart indicating an entry of a cipher code in the embodiment of the key-less entry system according to the present invention.

In this embodiment, the cipher-code entry is performed by operating the door outer handle 2 slowly or quickly, which is disclosed with reference to a flowchart shown in FIG. 6.

Step S10: Enter reference data for the operational speed of the door outer handle 2 in the entry of the cipher code.

In this embodiment, an operational speed "quick" is entered as reference data by operating the door outer handle 2. The operational speed "quick" is opposite to an operational speed "slow" for entering the first digit of the cipher code.

While the door outer handle 2 is being operated in the entry of the reference data, a displacement speed of the magnetic unit 12 is detected by the magnetic sensor 14, as illustrated in FIG. 4A. The magnetic sensor 14 then generates a current corresponding to the displacement speed of the magnetic unit 12. The current is sent to the control unit 16 (FIG. 2), thus the operational speed "quick" being entered and stored as the reference data.

It is determined that the door outer handle 2 is operated slowly if the operating speed is slower than the stored operational speed "quick" (reference data). On the other hand, it is determined that the door outer handle 2 is operated quickly if the operational speed is faster than or almost equal to the stored operational speed "quick".

Step S11: Enter the cipher code by operating the door outer handle 2.

Figure 7:
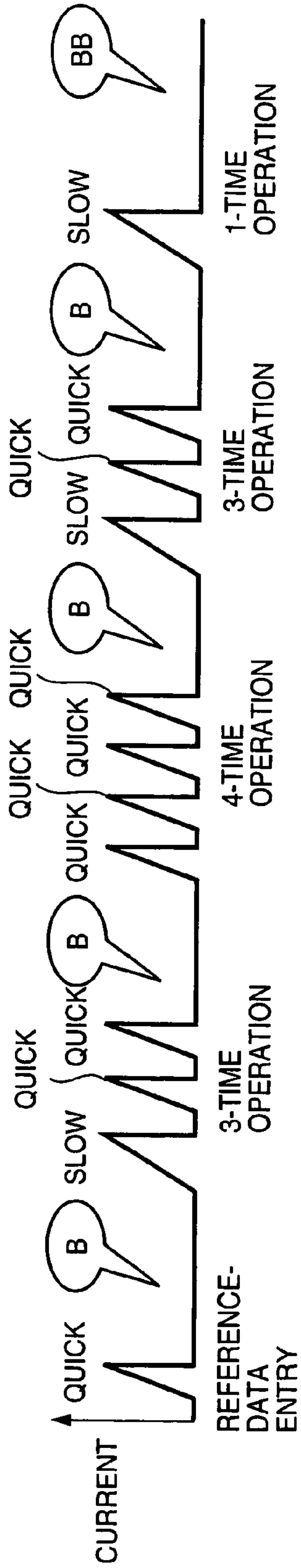
FIG. 7 illustrates a cipher-code entry in the embodiment of the key-less entry system according to the present invention.

As illustrated in FIG. 7, in this embodiment, the cipher code is entered by operating the door outer handle 2 three times, four times, three times, and one time, eleven times in total, after the entry of the reference data (quick).

In detail, an operator, such as a car owner, operates the door outer handle 2 three times at the operational speeds "slow", "quick" and "quick" in order, thus the first digit of the cipher code being entered. The buzzer 20 (FIG. 2) goes off one time when a predetermined period of time elapses. The signs "B" and "BB" in FIG. 7 indicate that the buzzer 20 goes off one time and two times, respectively.

The operator then operates the door outer handle 2 four times at the operational speeds "quick", "quick", "quick" and "quick" in order, thus the second digit of the cipher code being entered. The buzzer 20 goes off one time again when the predetermined period of time elapses.

Next, the operator operates the door outer handle 2 three times at the operational speed "slow", "quick" and "quick" in order, thus the third digit of the cipher code being entered. The buzzer 20 goes off one time again when the predetermined period of time elapses.

Still, the operator operates the door outer handle 2 one time at the operational speed "slow", thus the fourth digit of the cipher code being entered. The buzzer 20 goes off two times ("BB") when the predetermined period of time elapses, thus the cipher-code entry being completed. The entered cipher code is stored in the control unit 16.

Whether the door outer handle 2 is operated and the operating speed are determined on the basis of the current generated by the magnetic sensor 14.

The cipher-code entry disclosed above offers two ways of the entry of the data "quick" or "slow". Therefore, the cipher-code entry in this embodiment achieves less number of times of the entry than the known cipher-code entry, although requiring one-time reference-data entry, while increases the number of useable cipher codes.

The sequence continues as shown in FIG. 6.

Step S12: Check whether the cipher code entered by operating the door outer handle 2 matches the stored cipher code.

Step S13: Determine whether the entered cipher code matches or is equal to the stored one. If YES the sequence goes to step S14 whereas if NO, the sequence ends.

Step S14: The control unit 16 sends a control signal to the door-lock actuator 16 to actuate the door-locking mechanism to unlock a door.

As disclosed in detail, the keyless entry system in this embodiment decreases the number of times of entry than the known cipher-code entry while increases the number of useable cipher codes, thus enhancing a security against a car robbery, etc.

Moreover, the keyless entry system in this embodiment employs the operational speed "quick" or "slow," as reference data, thus achieving precise detection of the "quick" or "slow" operation of the door outer handle 2 without relation to individual difference in operational speeds.

The keyless entry system according to the present invention is not limited to the embodiment disclosed above.

For example, the door-handle operation detecting means is constituted by the magnetic unit 12 and the magnetic sensor 14 in this embodiment.

Figure 8A:
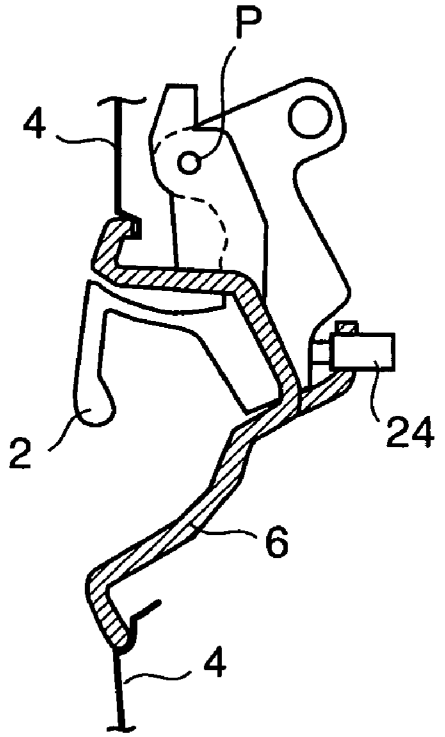
FIGS. 8A and 8B illustrate operational modes of the door outer handle in a modification to the embodiment of the key-less entry system according to the present invention.
Figure 8B:
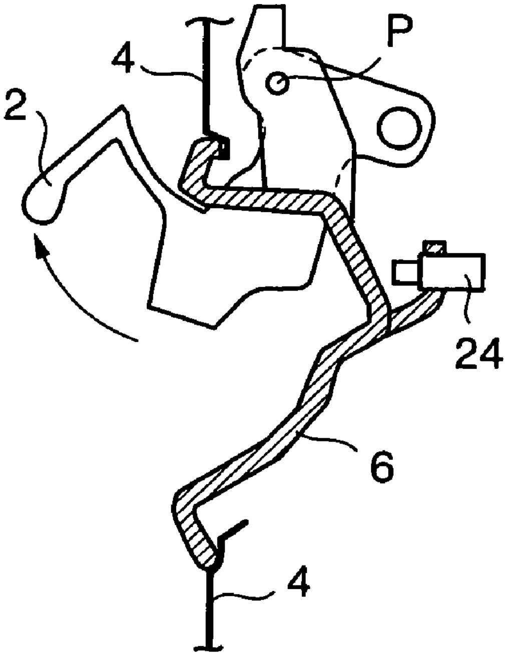

Not only that, the door-handle operation detecting means can be constituted by a contact switch 24, such as, shown in FIGS. 8A and 8B.

Illustrated in FIG. 8A is that the door outer handle 2 is under no operation whereas, in FIG. 8B, it is operated.

In this modification, it is determined that the door outer handle 2 is operated quickly or slowly when an intermission between operations of the handle 2 (between ON and OFF of the contact switch 24) is short or long, respectively, for discrimination between a correct cipher code and wrong or false one when entered.

Also in this modification, the cipher-code entry is made based on whether the door outer handle 2 is operated and an operational mode such as, its operational speed, thus decrease in the number of times of the entry while increase in the number of useable cipher codes being both achieved to enhance the security against the car robbery, etc.

The embodiment employs two patterns "quick" and "slow" for the operational speed of the door outer handle 2 in the entry of the cipher code. Not only that, three or more patterns such as "quick", "moderate" and "slow" can be used in the cipher-code entry.

Moreover, the embodiment sets the operational speed entered first as the reference data. Not only that, an intermediate operational speed between an operational speed that entered first and another operational speed in the entry of the first digit of the cipher code can be set as the reference data.

As disclosed above in detail, according to the keyless entry system and also the method of unlocking a vehicle door, cipher-code entry is made based on whether the door outer handle is operated and an operational mode, such as, its operational speed, thus decrease in the number of times of entry while increase in the number of useable cipher codes being both achieved to enhance the security against the car robbery, etc.

What is claimed is:

1. A vehicle key-less entry system, comprising:

door-handle operation detecting means for detecting whether or not a vehicle door handle is operated and an operational mode by detecting a speed of the door handle, for entering a cipher code;

checking means for checking whether the entered cipher code is equal to a prestored cipher code based on the detected operational mode; and locking controlling means for controlling a locking mechanism to unlock a vehicle door when the entered cipher code is equal to the prestored cipher code, wherein the door-handle operation detecting means detects the speed of the door handle based on at least two operational speed patterns.

2. The vehicle key-less entry system according to claim 1, wherein the door-handle operation detecting means includes a contact switch for detecting an operation of the door handle.

3. The vehicle key-less entry system according to claim 2, further comprising an escutcheon section provided in the vehicle door, the switch being attached to the escutcheon section.

4. The vehicle key-less entry system according to claim 2, further comprising said escutcheon section having a link arm provided in the vehicle door, the switch being attached to the link arm.

5. The vehicle key-less entry system according to claim 1, wherein the door-handle operation detecting means includes a non-contact switch for detecting an operation of the door handle.

6. The vehicle key-less entry system according to claim 5, further comprising an escutcheon section provided in the vehicle door, the switch being attached to the escutcheon section.

7. The vehicle key-less entry system according to claim 5, further comprising said escutcheon section having a link arm provided in the vehicle door, the switch being attached to the link arm.

8. The vehicle key-less entry system according to claim 1, wherein the door-handle operation detecting means detects the speed of the door handle based on a quick operational speed pattern and a slow operational speed pattern.

9. The vehicle key-less entry system according to claim 8, wherein the door-handle operation detecting means detects a door handle operation for entering an operational speed of the door handle as reference data.

10. A vehicle equipped with the key-less entry system according to claim 1.

11. A method of unlocking a vehicle door, comprising the steps of:

detecting whether or not a vehicle door handle is operated and at least two operational speed patterns when the door handle is detected as operated for entering a cipher code;

checking whether the entered cipher code is equal to a prestored cipher code based on the detected operational speed; and controlling a locking mechanism to unlock a vehicle door when the entered cipher code is equal to the prestored cipher code.

12. The method of unlocking a vehicle door according to claim 11, further comprising a step of entering an operational speed of the door handle as reference data.

13. The method of unlocking a vehicle door according to claim 12, further comprising the step of determining that the door handle is operated quickly when the door handle is operated at a speed almost equal to or higher than the reference data.

14. The method of unlocking a vehicle door according to claim 12, further comprising the step of determining that the door handle is operated slowly when the door handle is operated at a speed lower than the reference data.

* * * * *